United States Patent

Machida

(10) Patent No.: US 9,595,717 B2
(45) Date of Patent: Mar. 14, 2017

(54) NONAQUEOUS ELECTROLYTE COMPOSITION AND NONAQUEOUS ELECTROLYTE SECONDARY BATTERY

(75) Inventor: Masaki Machida, Fukushima (JP)

(73) Assignee: Sony Corporation, Tokyo (JP)

(*) Notice: Subject to any disclaimer, the term of this patent is extended or adjusted under 35 U.S.C. 154(b) by 225 days.

(21) Appl. No.: 13/014,830

(22) Filed: Jan. 27, 2011

(65) Prior Publication Data

US 2011/0189539 A1 Aug. 4, 2011

(30) Foreign Application Priority Data

Feb. 1, 2010 (JP) ................... 2010-019980

(51) Int. Cl.
| | | |
|---|---|---|
| *H01M 10/04* | (2006.01) | |
| *H01M 4/62* | (2006.01) | |
| *H01M 10/0525* | (2010.01) | |
| *H01M 10/0565* | (2010.01) | |
| *H01M 10/42* | (2006.01) | |

(52) U.S. Cl.
CPC ....... *H01M 4/621* (2013.01); *H01M 10/0525* (2013.01); *H01M 10/0565* (2013.01); *H01M 10/4235* (2013.01); *Y02E 60/122* (2013.01)

(58) Field of Classification Search
USPC ............... 429/302, 303, 319, 347, 251–252
See application file for complete search history.

(56) References Cited

U.S. PATENT DOCUMENTS

| | | | |
|---|---|---|---|
| 6,365,299 B1 | 4/2002 | Miyaki et al. | |
| 6,642,294 B1 | 11/2003 | Bauer et al. | |
| 6,855,378 B1* | 2/2005 | Narang | 427/553 |
| 9,070,935 B2* | 6/2015 | Murata | H01M 2/1653 |
| 2002/0061449 A1 | 5/2002 | Maruo et al. | |
| 2007/0178384 A1 | 8/2007 | Kajita et al. | |

FOREIGN PATENT DOCUMENTS

| | | |
|---|---|---|
| EP | 1189243 A2 | 3/2002 |
| JP | 10-214640 | 8/1998 |
| JP | 2009054583 | 3/2009 |

OTHER PUBLICATIONS

Ceramic Material properties chart. https://www.ceramicindustry.com/ext/resources/pdfs/2013-CCD-Material-Charts.pdf.*
European Office Action issued Jul. 11, 2012 corresponding to European Appln. No. 11151911.2.
EP Search Report for corresponding 11151911.2 dated May 6, 2011; 6 pages.
Chinese Office Action issued Mar. 25, 2014 corresponding to Chinese Appln. No. 201110026070.0.

* cited by examiner

*Primary Examiner* — Tracy Dove
(74) *Attorney, Agent, or Firm* — K&L Gates LLP (57) ABSTRACT

A nonaqueous electrolyte composition includes: an electrolyte salt; a nonaqueous solvent; a matrix polymer; and a ceramic powder having a thermal conductivity of 50 W/m° C. or more.

10 Claims, 3 Drawing Sheets

NONAQUEOUS ELECTROLYTE COMPOSITION AND NONAQUEOUS ELECTROLYTE SECONDARY BATTERY

CROSS REFERENCES TO RELATED APPLICATIONS

The present application claims priority to Japanese Priority Patent Application JP 2010-019980 filed in the Japan Patent Office on Feb. 1, 2010, the entire contents of which is hereby incorporated by reference.

BACKGROUND

The application relates to nonaqueous electrolytes, nonaqueous electrolyte secondary batteries, and nonaqueous electrolyte secondary battery manufacturing methods. Specifically, the application relates to a nonaqueous electrolyte composition disposed in contact with at least one of a positive electrode and a negative electrode, and that includes a nonaqueous solvent, an electrolyte salt, a matrix polymer, and a ceramic powder, and to a nonaqueous electrolyte secondary battery.

With the advent of various portable electronic devices, there have been efforts to reduce the size and weight of the devices. This trend is also seen in batteries used as the power supply of portable electronic devices, requiring the size of the battery itself to be reduced, or the storage space in portable electronic devices to be used more efficiently for further reduction in the size and weight of the portable electronic devices. Lithium ion secondary batteries that have large energy density are known to be most desirable for meeting such demands.

Lithium ion secondary batteries are lightweight and have high energy density, and can thus be fabricated into very thin batteries. Because of these and other advantages, for example, those using a laminate film for the exterior member have already put to practical applications. For purposes relating to the prevention of leaking, such batteries using a laminate film for the exterior member use an electrolytic solution as an electrolyte, and a matrix polymer provided to hold the electrolytic solution. This type of battery is known as a polymer battery.

While the polymer battery offers great freedom in terms of shape because of the aluminum laminate film used for the exterior member, the battery may lack sufficient strength, and tends to undergo deformation under strong force that may be applied by wrong use of the battery. This is not problematic as long as the battery is packed in a strong exterior package. However, the recent demand for larger capacity has forced the use of simple exterior packages, increasing the chance for greater deformation, and the likelihood of shorting in the battery, with the result that the battery function may be lost.

As a countermeasure against such problems, batteries have been proposed that use ceramics applied to the electrode surface, as described in, for example, JP-A-10-214640 (Patent Document 1).

SUMMARY

However, while the battery described in Patent Document 1 can increase strength (load) against shorting, the impregnation of the electrolytic solution in the electrodes tends to be poor, which may lower battery characteristics.

Accordingly, there is a need for a nonaqueous electrolyte composition and a nonaqueous electrolyte secondary battery with which the strength (load) against shoring can be increased without lowering battery characteristics.

The present inventor has conducted intensive studies to this end, and found that a nonaqueous electrolyte disposed in contact with at least one of the positive electrode and the negative electrode, which electrolyte includes a nonaqueous solvent, an electrolyte salt, a matrix polymer, and a predetermined ceramic powder, can provide the desired nonaqueous electrolyte composition and nonaqueous electrolyte secondary battery. The application has been completed based on this finding.

A nonaqueous electrolyte composition of an embodiment includes an electrolyte salt, a nonaqueous solvent, a matrix polymer, and a ceramic powder having a thermal conductivity of 50 W/m° C. or more.

A nonaqueous electrolyte secondary battery of another embodiment includes a positive electrode, a negative electrode, a separator disposed between the positive electrode and the negative electrode, and a nonaqueous electrolyte. The nonaqueous electrolyte includes an electrolyte salt, a nonaqueous solvent, a matrix polymer, and a ceramic powder having a thermal conductivity of 50 W/m° C. or more.

The electrolyte layer of the embodiment contains a highly conductive ceramic powder, and thus has improved voltage resistance of an electrolyte layer for improved heat conductivity.

According to the embodiment, deformation or shorting due to external pressure can be prevented without lowering battery characteristics such as cycle characteristics, even in batteries sheathed with an external member of a simple configuration.

Additional features and advantages are described herein, and will be apparent from the following Detailed Description and the figures.

DETAILED DESCRIPTION

Embodiments of the present application will be described below in detail with reference to the drawings.

1. First Embodiment (an example of a nonaqueous electrolyte)
2. Second Embodiment (an example of a nonaqueous electrolyte secondary battery)
3. Third Embodiment (an example of a nonaqueous electrolyte secondary battery manufacturing method)

1. First Embodiment

In First Embodiment, a nonaqueous electrolyte according to the application is described in detail.

[Configuration of Nonaqueous Electrolyte]

A nonaqueous electrolyte composition of the embodiment includes an electrolyte salt, a nonaqueous solvent, a matrix polymer, and a predetermined ceramic powder, and is suitably used as the nonaqueous electrolyte of a lithium ion nonaqueous electrolyte secondary battery. In the embodiment, a ceramic material having a thermal conductivity of 50 W/m° C. or more is used as the predetermined ceramic powder.

The nonaqueous electrolyte composition is formed as a gel electrolyte layer prepared, for example, by being applied to the surfaces of the positive electrode and the negative electrode, and by drying the composition to evaporate the solvent.

[Ceramic Powder]

In the embodiment, a ceramic material having a thermal conductivity of 50 W/m° C. or more is used as the ceramic powder. Examples of such ceramic material include silicon carbide (SiC), aluminum nitride (AlN) and boron nitride (BN), which may be used alone or as a mixture of two or more. Typical ceramic powders include alumina ($Al_2O_3$), zirconia (ZrO), titania ($TiO_2$), silica ($SiO_2$), and magnesia ($MgO_2$). The silicon carbide (SiC), aluminum nitride (AlN), and boron nitride (BN) used in the application have higher thermal conductivities than alumina ($Al_2O_3$), zirconia (ZrO), titania ($TiO_2$), silica ($SiO_2$), and magnesia ($MgO_2$) in the order of 5 to several ten fold.

The ceramic materials exemplified above are desirable because these ceramics can stably exist in the battery, and do not cause any adverse effects on battery reaction, in addition to having a large volumetric heat capacity.

The ceramic powder used in the embodiment has an average particle size of preferably 0.1 μm or more and 2.5 μm or less. With an average particle size of less than 0.1 the ceramic powder may agglomerate. An average particle size exceeding 2.5 μm may lead to poor appearance in batteries that have an exterior laminate film.

Preferably, the ceramic powder has a Gaussian distribution for the particle distribution. This is advantageous because excessively large and small particles will not be mixed in large numbers, and productivity and battery characteristics become stable.

In the nonaqueous electrolyte of the embodiment, it is preferable that the mix ratio of the ceramic powder and the matrix polymer be 1/1 or more and 6/1 or less, more preferably 1/1 or more and 5/1 or less in terms of mass ratio. With a ceramic powder-to-matrix polymer mix ratio of less than 1/1, the effect of including the ceramic powder becomes small. Above 6/1, cycle characteristics or other battery characteristics may become insufficient.

In the nonaqueous electrolyte secondary battery using the nonaqueous electrolyte of the embodiment, it is preferable that the ceramic powder be present in the proportion of 0.5 mg/cm$^2$ or more and 3.6 mg/cm$^2$ or less, more preferably 0.6 mg/cm$^2$ or more and 3.5 mg/cm$^2$ or less per unit area between the positive electrode and negative electrode, specifically, in each area defined by the unit area of the positive electrode and negative electrode in the nonaqueous electrolyte portion sandwiched between the opposing positive electrode and negative electrode. Less than 0.5 mg/cm$^2$, the effect of including the ceramic powder becomes small. Above 3.6 mg/cm$^2$, cycle characteristics or other battery characteristics may become insufficient.

[Nonaqueous Solvent]

Various high dielectric solvents and low-viscosity solvents can be used as the nonaqueous solvent used for the nonaqueous electrolyte of the embodiment. The high dielectric solvent is not particularly limited, though compounds such as ethylene carbonate and propylene carbonate can be suitably used. Aside from these examples, cyclic carbonate esters such as butylene carbonate, vinylene carbonate, 4-fluoro-1,3-dioxolan-2-one (fluoroethylene carbonate), 4-chloro-1,3-dioxolan-2-one (chloroethylene carbonate), and trifluoromethylethylene carbonate can be used.

Further, for example, lactones such as γ-butyrolactone and γ-valerolactone, lactams such as N-methylpyrrolidone, cyclic carbamic acid esters such as N-methyloxazolidinone, and sulfone compounds such as tetramethylenesulfone also may be used as the high dielectric solvent, instead of, or in addition to, the cyclic carbonate ester.

Compounds such as ethylmethyl carbonate and diethyl carbonate can be suitably used as the low-viscosity solvent. Other examples of low-viscosity solvent include chain carbonate ester such as dimethyl carbonate, and methylpropyl carbonate; chain carboxylic acid esters such as methyl acetate, ethyl acetate, methyl propionate, ethyl propionate, methyl butyrate, methyl isobutyrate, trimethyl methyl acetate, and trimethyl ethyl acetate; chain amides such as N,N-dimethylacetoamide; chain carbamic acid esters such as N,N-diethylcarbamic acid methyl, and N,N-diethylcarbamic acid ethyl; and ethers such as 1,2-dimethoxyethane, tetrahydrofuran, tetrahydropyran, and 1,3-dioxolan.

In the nonaqueous electrolyte of the embodiment, the high dielectric solvent and the low-viscosity solvent may be used either alone or as any mixture of two or more. The content of the nonaqueous solvent is preferably 70 to 90 mass %. Less than 70 mass %, the viscosity may become excessive. Above 90 mass %, sufficient conductivity may not be obtained.

[Matrix Polymer]

The nonaqueous electrolyte of the embodiment contains a matrix polymer. The matrix polymer impregnates or holds the electrolyte salt, the nonaqueous solvent, and the ceramic powder. Leaking of the nonaqueous electrolyte in the product battery can be effectively prevented by the swelling, gelling, or immobilization of the polymer compound.

The matrix polymer may be, for example, polyvinyl formal, polyacrylic acid ester, or polyvinylidene fluoride of the following formulae (1) to (3), respectively. Copolymers containing these materials as the main components also may be used.

(1)

In the formula (1), N represents the degree of polymerization, which is preferably 100 to 10,000. Gelling may become insufficient when N<100. Above 10,000, viscosity increases and the capacity may be lowered.

(2)

In the formula (2), R represents $C_nH_{2n-1}O_m$ (where n is an integer of 1 to 8, and m is an integer of 0 to 4), N represents the degree of polymerization, which is preferably 100 to 10,000. When N<100, gelling becomes difficult. Above 10,000, fluidity may be lowered.

(3)

In the formula (3), N represents the degree of polymerization, which is preferably 100 to 10,000. When N<100, gelling becomes insufficient. Above 10,000, viscosity increases, and the capacity may be lowered. When the matrix polymer contains polyvinylidene fluoride, the matrix polymer preferably has a weight-average molecular weight of 550,000 or more. Sufficient cycle characteristics may not be obtained with a weight-average molecular weight of less than 550,000.

The content of the matrix polymer is preferably 0.1 to 5 mass %. Less than 0.1 mass %, gelling becomes difficult, and it becomes difficult to evenly hold the ceramic powder. Above 5 mass %, reduction in energy density, or other adverse effects may occur in battery characteristics.

[Electrolyte Salt]

The electrolyte salt used for the nonaqueous electrolyte of the embodiment is not limited, as long as it can be dissolved or dispersed in the nonaqueous solvent and generates ions. Lithium salts such as lithium hexafluorophosphate ($LiPF_6$) can be suitably used, though the electrolyte salt is not limited to this. Aside from lithium hexafluorophosphate ($LiPF_6$), the electrolyte salt may be an inorganic lithium salt such as lithium tetrafluoroborate ($LiBF_4$), lithium hexafluoroarsenate ($LiAsF_6$), lithium hexafluoroantimonate ($LiSbF_6$), lithium perchloride ($LiClO_4$), and lithium aluminum tetrachloride ($LiAlCl_4$); or a lithium salt of perfluoroalkane sulfonic acid derivatives, such as lithium trifluoromethanesulfonate ($LiCF_3SO_3$), lithium bis(trifluoromethanesulfone)imide ($LiN(CF_3SO_2)_2$), lithium bis(pentafluoroethanesulfone)methide ($LiC(C_2F_5SO_2)_2$), and lithium tris(trifluoromethanesulfone)methide ($LiC(CF_3SO_2)_3$). These may be used either alone or as a mixture of two or more.

In the case of a lithium salt, the concentration of the electrolyte salt is preferably 0.5 mol/kg or more and 2.1 mol/kg or less, more preferably 0.6 mol/kg or more and 2.0 mol/kg or less. Less than 0.5 mol/kg, a high battery capacity may not be obtained as the amount of electrolyte component becomes smaller by the addition of the ceramic powder. Above 2.1 mol/kg, the viscosity of the electrolytic solution becomes excessively high, and desired battery characteristics, such as low-temperature characteristics, may not be obtained.

The nonaqueous electrolyte of the embodiment including the ceramic powder, the matrix polymer, the nonaqueous solvent, and the electrolyte salt as the necessary components may contain additional components. Specifically, for example, the nonaqueous electrolyte may be combined with a carbonate ester that has a multiple bond. In this way, the percentage remaining discharge capacity during repeated charging and discharging can be further improved. Typically, vinylene carbonate as an example of a carbonate ester having a carbon-carbon multiple bond (typically, a carbonate ester having a hydrocarbon group with a carbon-carbon multiple bond (for example, a carbon-carbon double bond or triple bond)) can be suitably used as a carbonate ester having a multiple bond. However, the multiple bond-containing carbonate ester is not limited to this. Specifically, vinyl ethylene carbonate also can be used, for example.

In the nonaqueous electrolyte of the embodiment, the content of the multiple bond-containing carbonate ester is preferably 0.05 mass % or more and 5 mass % or less, more preferably 0.1 mass % or more and 3 mass % or less, further preferably 0.2 mass % or more and 2 mass % or less. A content less than 0.05 mass % is ineffective. Above 5 mass %, the discharge capacity may be lowered.

Surfactants may be used to improve the dispersibility of the ceramic powder, as follows.

[Surfactants]

Any surfactants can be used as long as the ceramic powder can be dispersed. The preferred examples include hydrocarbon surfactants, and silicone surfactants. Nonionic hydrocarbon surfactants and silicone surfactants are particularly preferred because these surfactants do not generate ions. Examples of hydrocarbon surfactant include nonionic hydrocarbon surfactants such as polyoxyethylene alkyl ether, polyoxyethylene alkylphenyl ether, alkyl pyrrolidone (such as 1-octyl-2-pyrrolidone), alkyl glucoside, sorbitan fatty acid ester, mono and diethanolamine fatty acid amide, alkylamine polyoxyethylene adduct, ethoxylated tetramethyl dodecenediol, tetramethyl decenediol, glycerin fatty acid ester, pentaerythritol fatty acid ester, polyoxyethylene polyoxypropyrene glycol, polyethylene glycol fatty acid ester, and fatty acid polyoxyethylene sorbitan.

Examples of polyoxyethylene alkyl ether include polyoxyethylene lauryl ether, polyoxyethylene stearyl ether, and polyoxyethylene oleyl ether. Examples of polyoxyethylene alkylphenyl ether include polyoxyethylene octylphenyl ether, and polyoxyethylene nonylphenyl ether. Examples of polyethylene glycol fatty acid ester include polyethylene glycol dilaurate, and polyethylene glycol distearate.

Examples of silicone surfactant include nonionic silicone surfactants such as dimethyl silicone, aminosilane, acrylsilane, vinylbenzyl silane, vinylbenzyl amino silane, glycidosilane, mercaptosilane, dimethylsilane, polydimethylsiloxane, polyalkoxysiloxane, hydrodiene-modified siloxane, vinyl-modified siloxane, hydroxy-modified siloxane, amino-modified siloxane, carboxyl-modified siloxane, halogenated modified siloxane, epoxy-modified siloxane, methacryloxy-modified siloxane, mercapto-modified siloxane, fluorine-modified siloxane, alkyl-modified siloxane, phenyl-modified siloxane, and alkylene oxide-modified siloxane.

The hydrocarbon surfactants and the silicone surfactants may be used either alone or as any mixture of two or more. The surfactant content is preferably 0.3 to 5.0 parts by mass with respect to 100 parts by mass of the filler. In this range of surfactant content, the strength (load) against shorting can be further increased, without essentially lowering battery characteristics.

2. Second Embodiment

A nonaqueous electrolyte secondary battery of an embodiment is described below.

[Overview of Nonaqueous Electrolyte Secondary Battery Configuration]

Figure 1:
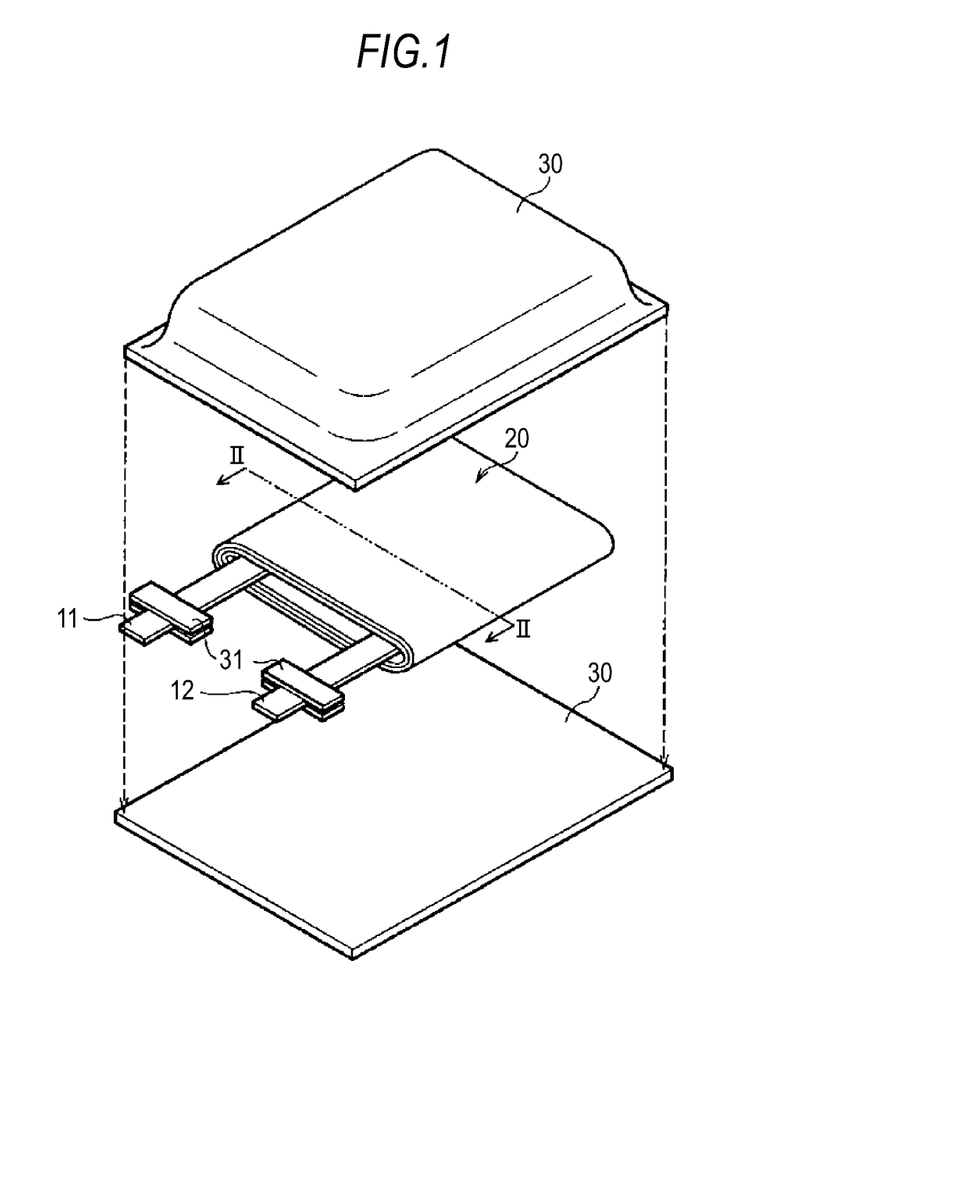
FIG. 1 is an exploded perspective view illustrating an example of a laminated secondary battery as a nonaqueous electrolyte secondary battery according to an embodiment.

FIG. 1 is an exploded perspective view illustrating an example of a laminated secondary battery as an embodiment of a nonaqueous electrolyte secondary of the application. As illustrated in FIG. 1, the secondary battery is configured to include a battery element 20 provided with a positive electrode terminal 11 and a negative electrode terminal 12, and that is sealed inside a film-like exterior member 30. The positive electrode terminal 11 and the negative electrode terminal 12 are provided to extend out of the exterior member 30, for example, in the same direction. The positive electrode terminal 11 and the negative electrode terminal 12 are formed using metallic material, for example, such as aluminum (Al), copper (Cu), nickel (Ni), and stainless steel.

Figure 2:
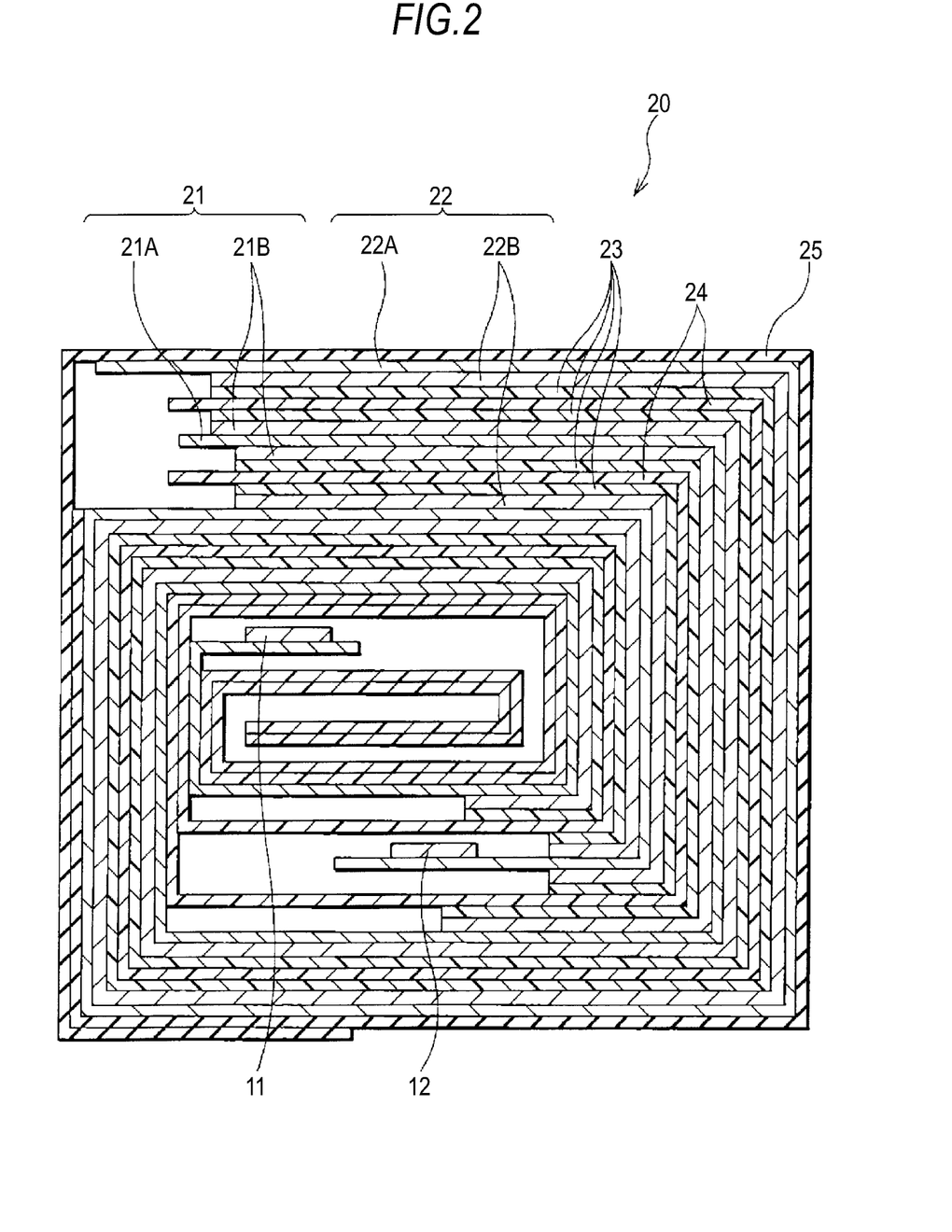
FIG. 2 is a cross sectional view of the battery element of FIG. 1 at II-II.

FIG. 2 is a cross sectional view of the battery element 20 of FIG. 1 at II-II. As illustrated in the Figure, the battery element 20 includes a positive electrode 21 and a negative electrode 22 disposed opposite from each other via a non-aqueous electrolyte layer 23 of a nonaqueous electrolyte according to the application, and a separator 24. The positive electrode 21 and the negative electrode 22 are wound around, and the outermost periphery is protected by a protective tape 25.

[Exterior Member]

The exterior member 30 is configured as a rectangular laminate film of, for example, a nylon film, an aluminum foil, and a polyethylene film laminated in this order. The exterior member 30 is disposed in such a manner that, for example, the polyethylene film side faces the battery element 20. The films are fused, or bonded together with an adhesive at the peripheries.

An adhesive film 31 that prevents entry of air is inserted between the exterior member 30 and the positive electrode and negative electrode terminals 11 and 12. The adhesive film 31 is formed using material that has adhesion for the positive electrode terminal 11 and the negative electrode terminal 12. When the positive electrode terminal 11 and the negative electrode terminal 12 are formed using the metallic materials exemplified above, it is preferable to form the adhesive film 31 using polyolefin resin, for example, such as polyethylene, polypropylene, modified-polyethylene, and modified-polypropylene.

Instead of the laminate film, other structures, for example, such as a metallic material-free laminate film, a polymer film such as polypropylene, or a metal film may be used to form the exterior member 30.

The laminate film is generally configured as a laminated structure of exterior layer/metal foil/sealant layer (the exterior layer and the sealant layer may be provided as multiple layers). In the foregoing example, the nylon film, and the aluminum foil, and the polyethylene film correspond to the exterior layer, the metal foil, and the sealant layer, respectively.

It should be noted that the metal foil merely serves as a moisture permeation-resistant barrier film, and, aside from the aluminum foil, material such as a stainless steel foil, a nickel foil, and a plated iron foil may be used. However, the aluminum foil is preferable, because it is thin, light-weight, and easily processable.

Examples of usable materials for the exterior member (exterior layer/metal foil/sealant layer) include Ny (nylon)/Al (aluminum)/CPP (undrawn polypropylene), PET (polyethylene terephthalate)/Al/CPP, PET/Al/PET/CPP, PET/Ny/Al/CPP, PET/Ny/Al/Ny/CPP, PET/Ny/Al/Ny/PE (polyethylene), Ny/PE/Al/LLDPE (straight-chain low-density polyethylene), PET/PE/Al/PET/LDPE (low-density polyethylene), and PET/Ny/Al/LDPE/CPP.

[Positive Electrode]

The positive electrode 21 is structured to include a positive electrode collector 21A, and a positive electrode active material layer 21B covering, for example, one of or both of the opposing surfaces of the positive electrode collector 21A. The positive electrode collector 21A has an exposed portion at one end along the longitudinal direction not covered with the positive electrode active material layer 21B. The positive electrode terminal 11 is attached to this exposed portion. The positive electrode collector 21A is formed using a metal foil, for example, such as an aluminum foil, a nickel foil, and a stainless steel foil.

The positive electrode active material layer 21B includes one or more positive electrode materials as positive electrode active materials that are capable of storing and releasing lithium ions, and may additionally include a conductive agent and a binder, as required.

Examples of positive electrode material capable of storing and releasing lithium ions include oxides such as vanadium oxide ($V_2O_5$), titanium dioxide ($TiO_2$), and manganese dioxide ($MnO_2$); sulfur (S); disulfides such as iron disulfide ($FeS_2$), titanium disulfide ($TiS_2$), and molybdenum disulfide ($MoS_2$); lithium-free chalcogenides such as niobium diselenide ($NbSe_2$) (particularly, laminar compounds and spinel-type compounds); lithium-containing compounds; and conductive polymer compounds such as polyaniline, polythiophene, polyacetylene, and polypyrrole.

Among these materials, lithium-containing compounds, capable of providing high voltage and high energy density, are preferred. Examples of lithium-containing compound include composite oxides that contain lithium and transition metal elements, and phosphoric acid compounds that contain lithium and transition metal elements. From the viewpoint of obtaining higher voltage, materials containing cobalt (Co), nickel (Ni), manganese (Mn), iron (Fe), copper (Cu), zinc (Zn), chromium (Cr), vanadium (V), and titanium (Ti), or any mixture of these are particularly preferable.

Such lithium-containing compounds are typically represented by the general formula (4) or (5) below. The compound of the formula (4) generally has a laminar structure, and the compound of the formula (5) generally has an olivine structure.

$$Li_rM^IO_2 \quad (4)$$

$$LisM^{II}PO_4 \quad (5)$$

In the formulae (4) and (5), $M^I$ and $M^{II}$ represent one or more transition metal elements, r and s generally fall in the ranges of $0.05 \leq r \leq 1.10$, and $0.05 \leq s \leq 1.10$, though the values vary depending on the charge and discharge state of the battery.

Specific examples of composite oxides that contain lithium and transition metal elements include lithium cobalt composite oxide ($LiCoO_2$), lithium nickel composite oxide ($LiNiO_2$), and solid solutions of these ($Li(Ni_tCo_uMn_v)O_2$ ($0<t<1$, $0<u<1$, $0<v<1$, $t+u+v=1$)); lithium nickel cobalt composite oxide ($LiNi_{1-w}CO_wO_2$ ($0<w<1$)), lithium manganese composite oxide ($LiMn_2O_4$) of a spinel-type structure, and solid solutions of these ($Li(Mn_{2-x}Ni_y)O_4$ ($0<x<2$, $0<y<2$)).

Specific examples of phosphoric acid compounds that contain lithium and transition metal elements include lithium iron phosphate compounds ($LiFePO_4$), and lithium iron manganese phosphate compounds ($LiFe_{1-z}Mn_zPO_4$ ($0<z<1$)). These compounds have an olivine structure.

The conductive agent is not particularly limited, as long as it can be mixed with the positive electrode active material in appropriate amounts to impart conductivity. For example, carbon materials such as graphite, carbon black, and Ketjen black can be used. These may be used alone or as a mixture of two or more. Aside from carbon material, materials such as metallic material and conductive polymer material may be used, provided that these are conductive.

The binder may be a known binder commonly used for the positive electrode mixture of this type of battery. Preferable examples include fluorine polymers such as polyvinyl fluoride, polyvinylidene fluoride, and polytetrafluoroethylene; and synthetic rubbers such as styrene butadiene rubbers, fluorine rubbers, and ethylene propylene diene rubbers. These may be used either alone or as a mixture of two or more.

[Negative Electrode]

As with the positive electrode 21, the negative electrode 22 is structured to include a negative electrode collector 22A, and a negative electrode active material layer 22B provided, for example, on one of or both of the opposing surfaces of the negative electrode collector 22A. The negative electrode collector 22A has an exposed portion at one end in the longitudinal direction not provided with the negative electrode active material layer 22B. The negative electrode terminal 12 is attached to this exposed portion. The negative electrode collector 22A is formed using a metal foil, for example, such as a copper foil, a nickel foil, and a stainless steel foil.

The negative electrode active material layer 22B includes negative electrode active material, which includes negative electrode material capable of storing and releasing lithium ions, and one or more lithium metals. The negative electrode active material layer 22B may additionally include a conductive agent and a binder, as required. Examples of the negative electrode material capable of storing and releasing lithium ions include carbon materials, metal oxides, and polymer compounds.

Examples of carbon materials include non-graphitizable carbon material, artificial graphite material, and graphite material. Specific examples include pyrolyzed carbons, cokes, graphites, glass-like carbons, organic polymer compound calcined products, carbon fibers, activated carbons, and carbon blacks. Examples of cokes include pitch cokes, needle cokes, and petroleum cokes. The organic polymer compound calcined products refer to carbonized products obtained by calcining polymeric material such as phenolic resin and furan resin at an appropriate temperature.

Examples of metal oxides include iron oxides, ruthenium oxides, and molybdenum oxides. Examples of polymer compounds include polyacetylene and polypyrrole.

Examples of the negative electrode material capable of storing and releasing lithium ions also include materials that contain at least one constituting element selected from metallic elements and semi-metallic elements capable of forming alloys with lithium. The negative electrode material may contain the metallic elements or semi-metallic elements alone, or may be an alloy or a compound of these elements. Further, materials that at least partly contain one or more phases of these may be used.

In the embodiment, the alloy may be of two or more metallic elements, or of one or more metallic elements and one or more semi-metallic elements. Non-metallic elements also may be contained. The composition may be a solid solution, a eutectic (eutectic mixture), or an intermetallic compound, or a mixture of two or more of these.

Examples of such metallic and semi-metallic elements include tin (Sn), lead (Pb), magnesium (Mg), aluminum, indium (In), silicon (Si), zinc (Zn), antimony (Sb), bismuth (Bi), gallium (Ga), germanium (Ge), arsenic (As), silver (Ag), hafnium (Hf), zirconium (Zr), and yttrium (Y).

Metallic elements and semi-metallic elements that belong to Group 14 of the periodic table (long form) are preferable, and silicon and tin are particularly preferable. Silicon and tin are highly capable of storing and releasing lithium, and can thus provide high energy density.

In the case of a tin alloy, the second constituting element after tin may be, for example, at least one selected from the group consisting of silicon (Si), magnesium (Mg), nickel (Ni), copper (Cu), iron (Fe), cobalt (Co), manganese (Mn), zinc (Zn), indium (In), silver (Ag), titanium (Ti), germanium (Ge), bismuth (Bi), antimony (Sb), and chromium (Cr).

In the case of a silicon alloy, the second constituting element after silicon may be, for example, at least one selected from the group consisting of tin, magnesium, nickel, copper, iron, cobalt, manganese, zinc, indium, silver, titanium, germanium, bismuth, antimony, and chromium.

Examples of tin compound and silicon compound include those containing, for example, oxygen (O) or carbon (C). The second constituting elements exemplified above may be contained in addition to tin or silicon.

Further, the negative electrode material may be an element, such as titanium, that forms a composite oxide with lithium. Deposition and dissolution of lithium metal, or of non-lithium metals such as magnesium and aluminum is also possible.

The materials used for the positive electrode also can be used for the conductive agent or binder.

[Separator]

The separator 24 is formed using an insulating thin film that has high ion permeability, and a predetermined mechanical strength. Specifically, for example, a porous film of polyolefin synthetic resin such as polypropylene and polyethylene, or a porous film of inorganic material such as ceramic nonwoven fabric may be used. Two or more such porous films may be laminated to form the separator 24. A film including a polyolefin porous film is particularly preferable, because such films provide good separation between the positive electrode 21 and the negative electrode 22, and further reduce internal shorting and open-circuit voltage drop.

Inside the exterior member 30 is filled with the battery element 20, and a nonaqueous electrolyte of the foregoing electrolyte composition.

[Configuration of Nonaqueous Electrolyte Battery]

Figure 3:
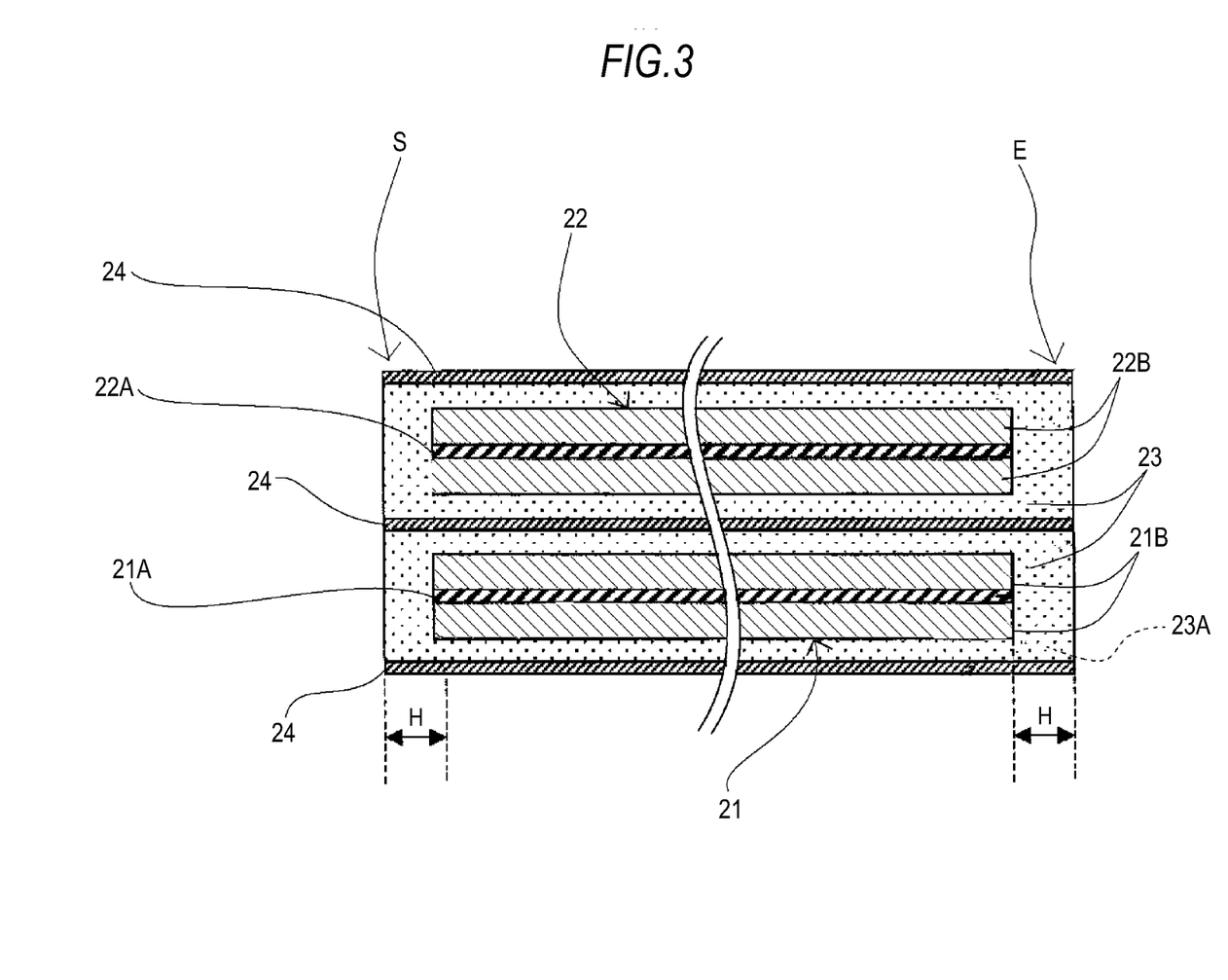
FIG. 3 is a schematic view illustrating a state of the battery element and the nonaqueous electrolyte of the nonaqueous electrolyte secondary battery illustrated in FIG. 1.

FIG. 3 is a schematic view representing a state of the battery element and the nonaqueous electrolyte in the nonaqueous electrolyte battery of FIG. 1, showing the state before winding the battery element. The battery element is wound by, for example, winding the laminated sheet of the separator and the positive electrode and negative electrode, starting from origin S and ending at terminal E.

As illustrated in FIG. 3, the nonaqueous electrolyte layer of the embodiment is interposed between the negative electrode active material layer 22B and the positive electrode active material layer 21B provided on the negative electrode collector 22A and the positive electrode collector 21A, respectively, mediating the reaction between the positive electrode and the negative electrode.

Preferably, the nonaqueous electrolyte 23 protrudes from the positive electrode active material layer 21B and the negative electrode active material layer 22B along the direction that crosses the laminate direction. It is preferable that the protruded portion (extension 23A) be formed at least one lateral end portion of the positive electrode active material layer 21B or the negative electrode active material layer 22B (longer marginal portion) with a width H of 0.1 mm or more and 2 mm or less, and cover the lateral end portions of the positive electrode active material layer 21B and the negative electrode active material layer 22B.

Cutting of the electrodes during fabrication often occurs at the lateral end portions of the positive electrode active material layer 21B and the negative electrode active material layer 22B, and thus a burr is likely to occur at these portions. Shoring due to such burrs can be avoided by covering the lateral end portions with the nonaqueous electrolyte 23. In the embodiment, shoring can be avoided without fail, because the nonaqueous electrolyte 23 contains a ceramic powder.

The extension width H of the nonaqueous electrolyte 23 from the lateral end portions of the positive electrode active material layer 21B and the negative electrode active material layer 22B is preferably 0.1 mm or more and 2 mm or less. Less than 0.1 mm, the effect of avoiding shorting may become insufficient. Increasing the width H above 2 mm does not add any notable effect.

Further, it is preferable that the extension 23A extend from at least one end portion of the positive electrode active material layer 21B or the negative electrode active material layer 22B (shorter marginal portion) with a width of 0.1 mm or more and 5 mm or less (the width being perpendicular to the plane of the paper; not illustrated), and cover the end portions of the positive electrode active material layer 21B and the negative electrode active material layer 22B.

The end portions of the positive electrode active material layer 21B and the negative electrode active material layer 22B are the portions where a positive electrode active material-containing positive electrode mixture, or a negative electrode active material-containing negative electrode mixture is applied, and as such a step may be formed at the end portions of the positive electrode active material layer 21B and the negative electrode active material layer 22B. Shorting is likely to occur at such steps. Shorting due to steps can be avoided by covering the end portions with the nonaqueous electrolyte 23. In the embodiment, shoring can be desirably avoided, because the nonaqueous electrolyte 23 contains a ceramic powder.

It is preferable that the nonaqueous electrolyte 23 protrudes from the end portions of the positive electrode active material layer 21B and the negative electrode active material layer 22B with a width of 0.1 mm or more and 5 mm or less. Less than 0.1 mm, the effect of avoiding shorting may become insufficient. Increasing the width above 5 mm does not add any notable effect. In the wound state, the extensions at the end portions can be checked near the origin S and terminal E, and the extensions at the lateral end portions can be checked at the extensions of a positive electrode lead and a negative electrode lead.

3. Third Embodiment

An example of a manufacturing method of the laminate nonaqueous electrolyte battery described above is described below.

[Production of Positive Electrode]

For example, when particulate active material is used as the positive electrode active material, the positive electrode active material is prepared into a positive electrode mixture by mixing it with a conductive agent and a binder, as required. The mixture is then dispersed in a dispersion medium such as N-methyl-2-pyrrolidone to produce a positive electrode mixture slurry. The positive electrode mixture slurry is then applied onto the both sides of the belt-like positive electrode collector 21A. The whole is dried, and the positive electrode active material layer 21B is formed on the positive electrode collector 21A upon compression molding.

[Production of Negative Electrode]

For example, when particulate active material is used as the negative electrode active material, the negative electrode active material is prepared into a negative electrode mixture by mixing it with a conductive agent and a binder, as required. The mixture is then dispersed in a dispersion medium such as N-methyl-2-pyrrolidone to produce a negative electrode mixture slurry. The negative electrode mixture slurry is then applied onto the both sides of the negative electrode collector 22A. The whole is dried, and the negative electrode active material layer 22B is formed on the negative electrode collector 22A upon compression molding.

[Production of Nonaqueous Electrolyte Composition]

A nonaqueous solvent, a matrix polymer, a ceramic powder, and a viscosity-adjusting solvent, for example, dimethyl carbonate (DMC) are mixed and stirred. A surfactant may be added to these materials.

[Production of Nonaqueous Electrolyte Battery]

The nonaqueous electrolyte composition is applied to the surfaces of the positive electrode 21 and the negative electrode 22 produced as above. The whole is dried to evaporate the viscosity-adjusting solvent, and the nonaqueous electrolyte layer is formed. Here, it is preferable that the nonaqueous electrolyte composition be applied to cover the positive electrode active material layer 21B and the negative electrode active material layer 22B, and to protrude from the lateral end portions of the positive electrode active material layer 21B and the negative electrode active material layer 22B by the distance of 0.1 mm or more and 2 mm or less, and from the end portions of the positive electrode active material layer 21B and the negative electrode active material layer 22B by the distance of 0.1 mm or more and 5 mm or less. The positive electrode, the separator, the negative electrode, and another separator are then laminated and wound with the aligned longer sides to form the battery element.

The battery element is sheathed with an exterior laminate film, and sealed at the peripheries by fusing. As a result, a nonaqueous electrolyte battery is produced.

When producing a nonaqueous electrolyte secondary battery that includes a gel electrolyte layer, the battery element may be produced by winding the positive electrode 21, the negative electrode 22, and the separator 13, after applying a monomer or polymer solution of a polymer compound such as polyvinylidene fluoride onto the surfaces of these members. Specifically, the gel electrolyte layer can be formed by injecting a liquid nonaqueous electrolytic solution after the battery element is stored inside the exterior member 30.

In the secondary battery described above, lithium ions are released from the positive electrode active material layer 21B upon charging, and stored in the negative electrode active material layer 22B via the nonaqueous electrolyte layer 23. Following discharge, lithium ions are released from the negative electrode active material layer 22B, and stored in the positive electrode active material layer 21B via the nonaqueous electrolyte layer 23.

EXAMPLES

The application is described in more detail below based on Examples and Comparative Examples. The application, however, is not limited by the following Examples.

Example 1

In Example 1, nonaqueous electrolyte batteries were produced under different conditions, using various ceramic powder materials in different amounts, and battery characteristics were evaluated.

Example 1-1

Production of Positive Electrode

A homogenous mixture including 91 parts by mass of the positive electrode active material lithium cobalt composite oxide (LiCoO$_2$), 6 parts by mass of the conductive agent graphite, and 10 parts by mass of the binder polyvinylidene fluoride (PVdF) was prepared. The mixture was dispersed in N-methyl-2-pyrrolidone (NMP) to obtain a positive electrode mixture slurry.

The positive electrode mixture slurry was evenly applied to the both sides of a 20-μm thick belt-like aluminum foil that becomes the positive electrode collector. Then, the whole was dried to form a positive electrode active material layer. The product was cut into a 38-mm width and a 700-mm length to produce the positive electrode, and a positive electrode terminal was attached.

[Production of Negative Electrode]

A homogenous mixture including 90 parts by mass of the negative electrode active material artificial graphite, and 10 parts by mass of the binder PVdF was prepared, and the mixture was dispersed in NMP to obtain a negative electrode mixture slurry. The negative electrode mixture slurry was evenly applied to the both sides of a 10-μm-thick belt-like copper foil that becomes the negative electrode collector. Then, the whole was dried to form a negative electrode mixture layer. The product was cut into a 40-mm width and a 650-mm length to produce the negative electrode, and a negative electrode terminal was attached.

[Production of Nonaqueous Electrolyte Material]

The nonaqueous electrolyte material was prepared by mixing 90 parts by mass of nonaqueous electrolytic solution, and 10 parts by mass of the matrix polymer polyvinylidene fluoride-hexafluoropropylene copolymer (PVdF:HFP=93.1:6.9 (mass ratio)). Then, the ceramic powder silicon carbide (SiC) having an average particle size of 0.1 μm was added to the material mixture at the ceramic powder:matrix polymer ratio of 1:1. Dimethyl carbonate (DMC) was also added as a viscosity-adjusting solvent to adjust the viscosity to 50 mPa·s. The matrix polymer polyvinylidene fluoride-hexafluoropropylene copolymer had a weight-average molecular weight of $60 \times 10^4$.

The nonaqueous electrolytic solution contained the electrolyte salt lithium hexafluorophosphate (LiPF$_6$) dissolved in a nonaqueous solvent at a concentration of 1.0 mol/kg. The nonaqueous solvent was prepared by mixing ethylene carbonate (EC) and propylene carbonate (PC) at the ethylene carbonate (EC):propylene carbonate (PC) ratio of 6:4 (mass ratio).

The dimethyl carbonate (DMC) is evaporated in the end, and does not remain in the battery.

[Production of Nonaqueous Electrolyte Secondary Battery]

The nonaqueous electrolyte material was applied to the both sides of the positive electrode and the negative electrode, and the solvent was evaporated to form a gel electrolyte layer. The gel electrolyte contained the ceramic powder in an amount of 0.6 mg/cm$^2$ per unit area of the positive electrode or negative electrode. The positive electrode and the negative electrode were laminated and wound via a 12-μm thick separator of a microporous polyethylene film, and were sealed in an exterior member formed of an aluminum laminated film. This completed the nonaqueous electrolyte secondary battery.

Table 1 presents some of the specifications of the nonaqueous electrolyte secondary battery obtained as above.

Examples 1-2 to 1-17, Comparative Examples 1-2 to 1-7

As presented in Tables 1 and 2, nonaqueous electrolyte batteries were produced as in Example 1-1, except that the average particle size of the ceramic powder silicon carbide (SiC), the amount of ceramic powder in the mixture, the salt concentration in the electrolyte, and the weight-average molecular weight of the matrix polymer were varied.

Examples 1-18 to 1-23, Comparative Examples 1-8 and 1-9

As presented in Tables 1 and 2, nonaqueous electrolyte batteries were produced as in Example 1-1, except that aluminum nitride (AlN) of various average particle sizes was used as the ceramic powder, and that the amount of ceramic powder in the mixture, the salt concentration in the electrolyte, and the weight-average molecular weight of the matrix polymer were varied.

Examples 1-24 to 1-29, Comparative Examples 1-10 and 1-11

As presented in Tables 1 and 2, nonaqueous electrolyte batteries were produced as in Example 1-1, except that boron nitride (BN) of various average particle sizes was used as the ceramic powder, and that the amount of ceramic powder in the mixture, the salt concentration in the electrolyte, and the weight-average molecular weight of the matrix polymer were varied.

Comparative Example 1-1

As presented in Table 2, a nonaqueous electrolyte battery was produced as in Example 1-1, except that the ceramic powder was not added.

[Performance Evaluation]

The performance of each battery obtained as above was evaluated. The results are presented in Tables 1 and 2.

(1) Short Load

A SUS rod (diameter, 10 mm; tip angle, 45°; R=4 mm) was pressed against the cell center at a rate of 3 mm/min, and the applied load that caused shorting was measured. The desirable short load is 1,000 N or more.

(2) Cycle Characteristics

The battery was discharged to 3.0 V at 1 ItA after 3-hour charging at 4.2 V-1 ItA, and the discharge capacity at the initial discharge was measured as the initial capacity. Charge and discharge were performed under the same conditions, and the discharge capacity after 500 cycles was measured. The percentage remaining capacity after 500 cycles was calculated using the following equation.

Percentage remaining capacity [%]=(Discharge capacity after 500 cycles/Initial capacity)×100.

The desirable percentage remaining capacity is 80% or more.

(3) Appearance

The battery surface was visually inspected, and the state of surface irregularities was checked. After the checking, 500 cycles of charge and discharge were performed under the conditions of (2), and the battery thickness was measured using a slide gauge. A change in battery thickness was calculated from the battery thicknesses before and after the charge and discharge. The battery appearance was considered desirable when the irregularities on the battery surface were less than 0.5 mm, and when the thickness change after the cycles was 10% or less.

The evaluation results are presented in Tables 1 and 2 below.

TABLE 1

|  | Ceramic powder | Average particle size [μm] | Amount of ceramic powder [mg/cm²] | Ceramic powder/-matrix polymer | Salt concentration [mol/kg] | Molecular weight of matrix polymer ×10⁴ | Short load [N] | Remaining capacity [%] | Appearance |
|---|---|---|---|---|---|---|---|---|---|
| Example 1-1 | SiC | 0.1 | 0.6 | 1/1 | 1.0 | 60 | 1090 | 83 | Excellent |
| Example 1-2 | SiC | 0.5 | 0.6 | 1/1 | 1.0 | 60 | 1120 | 87 | Excellent |
| Example 1-3 | SiC | 1.0 | 0.6 | 1/1 | 1.0 | 60 | 1120 | 89 | Excellent |
| Example 1-4 | SiC | 2.5 | 0.6 | 1/1 | 1.0 | 60 | 1160 | 90 | Excellent |
| Example 1-5 | SiC | 0.5 | 0.6 | 2/1 | 1.0 | 60 | 1120 | 85 | Excellent |
| Example 1-6 | SiC | 0.5 | 0.6 | 5/1 | 1.0 | 60 | 1240 | 84 | Excellent |
| Example 1-7 | SiC | 0.5 | 0.6 | 6/1 | 1.0 | 60 | 1330 | 81 | Good |
| Example 1-8 | SiC | 0.5 | 0.5 | 1/1 | 1.0 | 60 | 1020 | 85 | Excellent |
| Example 1-9 | SiC | 0.5 | 3.6 | 1/1 | 1.0 | 60 | 1380 | 81 | Good |
| Example 1-10 | SiC | 0.5 | 1.8 | 1/1 | 0.5 | 60 | 1250 | 80 | Excellent |
| Example 1-11 | SiC | 0.5 | 1.8 | 1/1 | 2.1 | 60 | 1270 | 87 | Excellent |
| Example 1-12 | SiC | 0.5 | 3.5 | 1/1 | 1.0 | 60 | 1330 | 85 | Excellent |
| Example 1-13 | SiC | 0.5 | 3.5 | 5/1 | 1.0 | 60 | 1330 | 84 | Excellent |
| Example 1-14 | SiC | 0.5 | 1.8 | 1/1 | 0.6 | 60 | 1260 | 83 | Excellent |
| Example 1-15 | SiC | 0.5 | 1.8 | 1/1 | 2.0 | 60 | 1250 | 92 | Excellent |
| Example 1-16 | SiC | 0.5 | 1.8 | 1/1 | 2.0 | 55 | 1260 | 87 | Excellent |
| Example 1-17 | SiC | 0.5 | 1.8 | 1/1 | 1.0 | 80 | 1260 | 87 | Excellent |
| Example 1-18 | AlN | 0.5 | 0.6 | 1/1 | 1.0 | 60 | 1100 | 87 | Excellent |
| Example 1-19 | AlN | 2.5 | 0.6 | 1/1 | 1.0 | 60 | 1140 | 88 | Excellent |
| Example 1-20 | AlN | 0.5 | 3.5 | 5/1 | 1.0 | 60 | 1320 | 84 | Excellent |
| Example 1-21 | AlN | 2.5 | 3.5 | 5/1 | 1.0 | 60 | 1320 | 84 | Excellent |
| Example 1-22 | AlN | 0.5 | 0.5 | 1/1 | 1.0 | 60 | 1100 | 86 | Excellent |
| Example 1-23 | AlN | 0.5 | 3.6 | 1/1 | 1.0 | 60 | 1340 | 81 | Good |
| Example 1-24 | BN | 0.5 | 0.6 | 1/1 | 1.0 | 60 | 1100 | 86 | Excellent |
| Example 1-25 | BN | 2.5 | 0.6 | 1/1 | 1.0 | 60 | 1140 | 88 | Excellent |
| Example 1-26 | BN | 0.5 | 3.5 | 5/1 | 1.0 | 60 | 1320 | 84 | Excellent |
| Example 1-27 | BN | 2.5 | 3.5 | 5/1 | 1.0 | 60 | 1340 | 85 | Excellent |
| Example 1-28 | BN | 0.5 | 0.5 | 1/1 | 1.0 | 60 | 1070 | 85 | Excellent |
| Example 1-29 | BN | 0.5 | 3.6 | 1/1 | 1.0 | 60 | 1350 | 81 | Good |

TABLE 2

|  | Ceramic powder | Average particle size [μm] | Amount of ceramic powder [mg/cm²] | Ceramic powder/-matrix polymer | Salt concentration [mol/kg] | Molecular weight of matrix polymer ×10⁴ | Short load [N] | Remaining capacity [%] | Appearance |
|---|---|---|---|---|---|---|---|---|---|
| Comparative Example 1-1 | — | — | — | — | 1.0 | 60 | 750 | 90 | Excellent |
| Comparative Example 1-2 | SiC | 0.5 | 0.15 | 1/1 | 1.0 | 60 | 820 | 86 | Good |
| Comparative Example 1-3 | SiC | 0.5 | 0.3 | 1/1 | 1.0 | 60 | 900 | 86 | Good |
| Comparative Example 1-4 | SiC | 0.05 | 0.6 | 1/1 | 1.0 | 50 | 1100 | 76 | Cell swelling |
| Comparative Example 1-5 | SiC | 2.8 | 0.6 | 1/1 | 1.0 | 38 | 1240 | 85 | Irregular appearance |
| Comparative Example 1-6 | SiC | 0.5 | 1.8 | 1/1 | 1.0 | 60 | 1240 | 71 | Cell distortion |
| Comparative Example 1-7 | SiC | 0.5 | 0.6 | 1/1 | 1.0 | 60 | 1210 | 54 | Cell distortion |
| Comparative Example 1-8 | AlN | 0.07 | 0.6 | 1/1 | 1.0 | 60 | 1050 | 77 | Cell swelling |
| Comparative Example 1-9 | AlN | 2.8 | 0.6 | 1/1 | 1.0 | 60 | 1180 | 83 | Irregular appearance |
| Comparative Example 1-10 | BN | 0.07 | 0.6 | 1/1 | 1.0 | 60 | 1070 | 78 | Cell swelling |
| Comparative Example 1-11 | BN | 2.8 | 0.6 | 1/1 | 1.0 | 60 | 1210 | 83 | Irregular appearance |

In Tables 1 and 2, the appearance is "Excellent" when the surface irregularities were 0.3 mm or less, and when the thickness increase of the nonaqueous electrolyte battery after the cycles was within 7% of the original thickness. The results are "Good" when the surface irregularities were 0.5 mm or less, and when the thickness increase of the nonaqueous electrolyte battery after the cycles was within 15% of the original thickness. Nonaqueous electrolyte batteries that had surface irregularities above 0.5 mm, or over 10% thickness increases from the original thickness are considered poor, and the state of battery appearance, and other battery conditions such as swelling are given in the Tables.

As can be seen from Table 1, Comparative Example 1-1 in which the gel electrolyte layer did not contain the ceramic powder has a smaller short load than in Examples and other Comparative Examples in which the gel electrolyte layer contained the ceramic powder. The short load becomes considerably high, 1,000 N or higher, when the amount of ceramic powder in the gel electrolyte layer per unit area is 0.5 mg/cm² or more.

An amount of ceramic powder in the gel electrolyte layer below 3.6 mg/cm² per unit area is not preferable, because it leads to poor battery appearance. Thus, the preferred amount of ceramic powder in the gel electrolyte layer per unit area is 0.5 mg/cm² or more and 3.6 mg/cm² or less.

As can be seen from, for example, Comparative Examples 1-4 and 1-5 and Examples 1-1 to 1-4, cycle characteristics lower, and the cell swells when the average particle size of the ceramic powder is as small as 0.05 µm. This is considered to be due to the reduced heat conductivity caused by the excessively small ceramic powder average particle size, and the accompanying difficulties in obtaining the effect of adding the ceramic powder. The excessively large ceramic powder average particle size of 2.8 µm or greater is not preferable, because it produces large irregularities on battery appearance, though desirable short load and cycle characteristics can be obtained. Taken together, the preferred ceramic powder average particle size is 0.1 µm or more and 2.5 µm or less.

The preferred ceramic powder average particle size is 0.1 µm or more and 2.5 µm or less also for the aluminum nitride (AlN) used in Comparative Examples 1-8 and 1-9 and Examples 1-18 and 1-19. The preferred ceramic powder average particle size is 0.1 µm or more and 2.5 µm or less also for the boron nitride (BN) used in Comparative Examples 1-10 and 1-11 and Examples 1-24 and 1-25.

The mix ratio of the ceramic powder and the matrix polymer is preferably 1/1 to 6/1. When the amount of ceramic powder mixed with the matrix polymer in this range is too small, the effect of adding the ceramic powder becomes small. When the amount of ceramic powder mixed with the matrix polymer is too large, cycle characteristics lower, though the resistance to short load increases.

As can be seen from Examples 10, 11, 14, and 15, cycle characteristics improve with increase in electrolyte salt concentration. Because the mixing of the ceramic powder reduces the gel electrolyte component, lowering of battery characteristics can be suppressed by increasing the amount of electrolyte salt. The electrolyte salt concentration is preferably 0.5 mol/kg or more and 2.1 mol/kg or less.

Example 2

In Example 2, nonaqueous electrolyte batteries were produced using different positive electrode active materials, different ceramic powder materials, and different nonaqueous electrolyte battery voltages, and battery characteristics were evaluated.

Example 2-1

A nonaqueous electrolyte battery was produced as in Example 1-1, except that silicon carbide (SiC) that had an average particle size of 0.5 µm was used as the ceramic powder.

Example 2-2

A nonaqueous electrolyte battery was produced as in Example 1-1, except that aluminum nitride (AlN) that had an average particle size of 0.5 µm was used as the ceramic powder.

Example 2-3

A nonaqueous electrolyte battery was produced as in Example 1-1, except that boron nitride (BN) that had an average particle size of 0.5 µm was used as the ceramic powder.

Example 2-4

A nonaqueous electrolyte battery was produced as in Example 1-1, except that lithium nickel oxide (LiNiO₂) was used as the positive electrode active material, and that silicon carbide (SiC) that had an average particle size of 0.5 µm was used as the ceramic powder.

Example 2-5

A nonaqueous electrolyte battery was produced as in Example 1-1, except that lithium nickel oxide (LiNiO₂) was used as the positive electrode active material, and that aluminum nitride (AlN) that had an average particle size of 0.5 µm was used as the ceramic powder.

Example 2-6

A nonaqueous electrolyte battery was produced as in Example 1-1, except that lithium nickel oxide (LiNiO₂) was used as the positive electrode active material, and that boron nitride (BN) that had an average particle size of 0.5 µm was used as the ceramic powder.

Comparative Example 2-1

A nonaqueous electrolyte battery was produced as in Example 1-1, except that the ceramic powder was not mixed.

Comparative Example 2-2

A nonaqueous electrolyte battery was produced as in Example 1-1, except that aluminum oxide (Al₂O₃) that had an average particle size of 0.5 µm was used as the ceramic powder.

Comparative Example 2-3

A nonaqueous electrolyte battery was produced as in Example 1-1, except that lithium nickel oxide (LiNiO₂) was used as the positive electrode active material, and that the ceramic powder was not mixed.

Comparative Example 2-4

A nonaqueous electrolyte battery was produced as in Example 1-1, except that lithium nickel oxide (LiNiO₂) was used as the positive electrode active material, and that aluminum oxide (Al₂O₃) that had an average particle size of 0.5 µm was used as the ceramic powder.

[Performance Evaluation]
The performance of each battery produced as above was evaluated as follows.
(4) Nail Puncture Safety Evaluation
Each nonaqueous electrolyte battery of Examples and Comparative Examples was heated to 75° C. in the fully charged state. A nail having a diameter of 3 mm was hammered into the central portion of the battery, and the presence or absence of gas spew was checked. The voltage that causes the gas spew was determined under gradually increasing nonaqueous electrolyte battery charge voltages.

The results are presented in Table 3 below.

TABLE 3

| | Positive electrode active material | Ceramic powder | Electrolyte later | | | | | |
|---|---|---|---|---|---|---|---|---|
| | | | Average particle size [μm] | Amount of ceramic powder [mg/cm$^2$] | Ceramic powder/-matrix polymer | Salt concentration [mol/kg] | Molecular weight of matrix polymer ×10$^4$ | Nail puncture safety [V] |
| Example 2-1 | Lithium cobalt oxide | SiC | 0.5 | 0.6 | 1/1 | 1.0 | 60 | 4.4 |
| Example 2-2 | Lithium cobalt oxide | AlN | 0.5 | 0.6 | 1/1 | 1.0 | 60 | 4.35 |
| Example 2-3 | Lithium cobalt oxide | BN | 0.5 | 0.6 | 1/1 | 1.0 | 60 | 4.35 |
| Example 2-4 | Lithium nickel oxide | SiC | 0.5 | 0.6 | 1/1 | 1.0 | 60 | 4.37 |
| Example 2-5 | Lithium nickel oxide | AlN | 0.5 | 0.6 | 1/1 | 1.0 | 60 | 4.32 |
| Example 2-6 | Lithium nickel oxide | BN | 0.5 | 0.6 | 1/1 | 1.0 | 60 | 4.32 |
| Comparative Example 2-1 | Lithium cobalt oxide | — | 0.5 | 0.6 | 1/1 | 1.0 | 60 | 4.2 |
| Comparative Example 2-2 | Lithium cobalt oxide | Al$_2$O$_3$ | 0.5 | 0.6 | 1/1 | 1.0 | 60 | 4.3 |
| Comparative Example 2-3 | Lithium nickel oxide | — | 0.5 | 0.6 | 1/1 | 1.0 | 60 | 3.95 |
| Comparative Example 2-4 | Lithium nickel oxide | Al$_2$O$_3$ | 0.5 | 0.6 | 1/1 | 1.0 | 60 | 4.12 |

As can be seen from Table 3, the gas spew voltage upon nail puncture is high in Examples 2-1 to 2-6 in which the ceramic powder according to the application was mixed. Specifically, there is high safety in actual use.

While the application has been described with respect to certain embodiments and examples, the application is not limited by these embodiments and examples, and various modifications are possible within the scope of the application.

For example, while the foregoing embodiments described the battery element that includes the wound laminate of the positive electrode and negative electrode, the application is also applicable to plate-shaped battery elements that include a pair of laminated positive electrode and negative electrode, or laminated battery elements that include a laminate of more than one positive electrode and negative electrode.

Further, while the application concerns batteries that use lithium as the electrode reacting material as described above, the technical idea of the application is also applicable to other alkali metals such as sodium (Na) and potassium (K); alkali earth metals such as magnesium (Mg) and calcium (Ca), and other light metals such as aluminum.

It should be understood that various changes and modifications to the presently preferred embodiments described herein will be apparent to those skilled in the art. Such changes and modifications can be made without departing from the spirit and scope and without diminishing its intended advantages. It is therefore intended that such changes and modifications be covered by the appended claims.

The application is claimed as follows:

1. A nonaqueous electrolyte secondary battery comprising:
    a positive electrode;
    a negative electrode;
    a separator disposed between the positive electrode and the negative electrode; and
    a nonaqueous electrolyte that includes an electrolyte salt, a nonaqueous solvent, a matrix polymer, and a ceramic powder having a thermal conductivity of 50 W/m° C. or more,
    wherein the ceramic powder is at least one selected from the group consisting of aluminum nitride (AlN) and boron nitride (BN), wherein the ceramic powder has an average particle size of 0.1 μm or more and 2.5 μm or less, wherein the ceramic powder is mixed in an amount of 0.5 mg/cm$^2$ or more and 3.6 mg/cm$^2$ or less per unit area of the positive electrode or the negative electrode,
    wherein the matrix polymer is at least one selected from the group consisting of polyvinyl formal, polyacrylic acid ester, polyvinylidene fluoride having a weight-average molecular weight of 550,000 or more, a copolymer of polyvinyl formal, a copolymer of polyacrylic acid ester and a copolymer of polyvinylidene fluoride, and
    wherein a mass ratio of the ceramic powder to the matrix polymer ranges from 2/1 to 5/1.

2. The nonaqueous electrolyte secondary battery according to claim 1, wherein the electrolyte salt is a lithium salt, and wherein the concentration of the lithium salt in the nonaqueous electrolyte is 0.5 mol/kg or more and 2.1 mol/kg or less.

3. The nonaqueous electrolyte secondary battery according to claim 1, wherein the matrix polymer contains polyvinylidene fluoride having a weight-average molecular weight of 550,000 or more.

4. The nonaqueous electrolyte secondary battery according to claim 1, wherein
    the nonaqueous electrolyte has an extension that protrudes from a positive electrode active material layer and a negative electrode active material layer in a direction that crosses a laminate direction, and
    the extension covers a width of 0.1 mm or more and 2 mm or less from a lateral end portion of at least one of the positive electrode active material layer and the negative electrode active material layer.

5. The nonaqueous electrolyte secondary battery according to claim 1, wherein the nonaqueous electrolyte includes a nonionic surfactant.

6. The nonaqueous electrolyte secondary battery according to claim 1, wherein the nonaqueous electrolyte consists essentially of the electrolyte salt, the nonaqueous solvent, the matrix polymer, and the ceramic powder.

7. The nonaqueous electrolyte secondary battery according to claim 1, wherein the matrix polymer is a polyvinylidene fluoride-hexafluoropropylene copolymer.

8. A nonaqueous electrolyte secondary battery comprising:
   a positive electrode;
   a negative electrode;
   a separator disposed between the positive electrode and the negative electrode; and
   a nonaqueous gel electrolyte layer that includes an electrolyte salt, a nonaqueous solvent, a matrix polymer, and a ceramic powder having a thermal conductivity of 50 W/m° C. or more,
   wherein the ceramic powder is at least one selected from the group consisting of aluminum nitride (AlN) and boron nitride (BN), wherein the ceramic powder has an average particle size of 0.1 µm or more and 2.5 µm or less, wherein the ceramic powder is mixed in an amount of 0.5 mg/cm$^2$ or more and 3.6 mg/cm$^2$ or less per unit area of the positive electrode or the negative electrode,
   wherein the matrix polymer is at least one selected from the group consisting of polyvinyl formal, polyacrylic acid ester, polyvinylidene fluoride having a weight-average molecular weight of 550,000 or more, a copolymer of polyvinyl formal, a copolymer of polyacrylic acid ester and a copolymer of polyvinylidene fluoride,
   wherein a mass ratio of the ceramic powder to the matrix polymer ranges from 2/1 to 5/1, and
   wherein the nonaqueous gel electrolyte layer is provided between the positive electrode and the negative electrode and in contact with the separator.

9. The nonaqueous electrolyte secondary battery according to claim 8, wherein the nonaqueous electrolyte gel layer surrounds each of the positive electrode and the negative electrode.

10. The nonaqueous electrolyte secondary battery according to claim 8, wherein the positive electrode comprises a positive electrode active material layer, the negative electrode comprises a negative electrode active material layer, and the nonaqueous electrolyte gel layer protrudes from lateral end portions of each of the positive electrode active material layer and the negative electrode active material layer.

* * * * *